US008065700B2

(12) United States Patent
Lee

(10) Patent No.: US 8,065,700 B2
(45) Date of Patent: Nov. 22, 2011

(54) METHODS AND APPARATUS FOR IDENTIFYING AUDIO/VIDEO CONTENT USING TEMPORAL SIGNAL CHARACTERISTICS

(75) Inventor: Morris Lee, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 12/639,942

(22) Filed: Dec. 16, 2009

(65) Prior Publication Data

US 2010/0095320 A1    Apr. 15, 2010

Related U.S. Application Data

(63) Continuation of application No. 11/404,276, filed on Apr. 14, 2006, now Pat. No. 7,650,616, which is a continuation of application No. PCT/US2004/018205, filed on Jun. 8, 2004.

(60) Provisional application No. 60/512,507, filed on Oct. 17, 2003.

(51) Int. Cl.
*H04N 60/32* (2006.01)
(52) U.S. Cl. ............... 725/19; 725/17; 725/18; 725/20
(58) Field of Classification Search ............... 725/17–20
See application file for complete search history.

(56) References Cited

U.S. PATENT DOCUMENTS

| | | | |
|---|---|---|---|
| 3,733,430 A | 5/1973 | Thompson et al. | |
| 3,845,391 A | 10/1974 | Crosby | |
| 3,849,729 A | 11/1974 | Baggem et al. | |
| 3,906,450 A | 9/1975 | Prado, Jr. et al. | |
| 3,919,479 A | 11/1975 | Moon et al. | |
| 3,947,624 A | 3/1976 | Miyake | |
| 4,025,851 A | 5/1977 | Haselwood et al. | |
| 4,313,197 A | 1/1982 | Maxemchuk | |
| 4,499,601 A | 2/1985 | Matthews | |
| 4,677,466 A | 6/1987 | Lert, Jr. et al. | |
| 4,703,476 A | 10/1987 | Howard | |
| 4,931,871 A | 6/1990 | Kramer | |
| 4,945,412 A | 7/1990 | Kramer | |
| 4,972,471 A | 11/1990 | Gross et al. | |
| 5,355,161 A | 10/1994 | Bird et al. | |
| 5,481,294 A | 1/1996 | Thomas et al. | |

(Continued)

FOREIGN PATENT DOCUMENTS

DE        4316297        5/1994

(Continued)

OTHER PUBLICATIONS

United States Patent and Trademark Office, Office Action issued in connection with U.S. Appl. No. 12/693,942, mailed Nov. 1, 2010, 11 pages.

(Continued)

*Primary Examiner* — Hunter Lonsberry
(74) *Attorney, Agent, or Firm* — Hanley, Flight & Zimmerman, LLC

(57) ABSTRACT

Methods and apparatus for identifying audio/video content using temporal characteristics of a signal are disclosed. The disclosed apparatus and methods receive a signature associated with audio/video content presented at a monitored site, wherein the signature is based on a plurality of time intervals associated with audio features of the audio/video content presented at the monitored site and identify the audio/video content presented at the monitored site based on the received signature.

19 Claims, 14 Drawing Sheets

U.S. PATENT DOCUMENTS

| | | | |
|---|---|---|---|
| 5,559,549 | A | 9/1996 | Hendricks et al. |
| 5,612,729 | A | 3/1997 | Ellis et al. |
| 5,881,360 | A | 3/1999 | Fong |
| 5,890,162 | A | 3/1999 | Huckins |
| 5,918,223 | A | 6/1999 | Blum et al. |
| 6,161,090 | A | 12/2000 | Kanevsky et al. |
| 6,185,527 | B1 | 2/2001 | Petkovic et al. |
| 6,272,176 | B1 | 8/2001 | Srinivasan |
| 6,405,166 | B1 | 6/2002 | Huang et al. |
| 6,434,520 | B1 | 8/2002 | Kanevsky et al. |
| 6,453,252 | B1 | 9/2002 | Laroche |
| 6,469,749 | B1 | 10/2002 | Dimitrova et al. |
| 6,477,707 | B1 | 11/2002 | King et al. |
| 6,505,160 | B1 | 1/2003 | Levy et al. |
| 6,542,869 | B1 | 4/2003 | Foote |
| 6,574,417 | B1 | 6/2003 | Lin et al. |
| 6,574,594 | B2 * | 6/2003 | Pitman et al. .................. 704/236 |
| 6,611,607 | B1 | 8/2003 | Davis et al. |
| 6,651,253 | B2 | 11/2003 | Dudkiewicz et al. |
| 2001/0005823 | A1 | 6/2001 | Fischer et al. |
| 2002/0019984 | A1 | 2/2002 | Rakib |
| 2002/0023020 | A1 | 2/2002 | Kenyon et al. |
| 2002/0082837 | A1 | 6/2002 | Pitman et al. |
| 2002/0083060 | A1 | 6/2002 | Wang et al. |
| 2002/0083451 | A1 | 6/2002 | Gill et al. |
| 2002/0083468 | A1 | 6/2002 | Dudkiewicz |
| 2002/0099555 | A1 | 7/2002 | Pitman et al. |
| 2002/0120925 | A1 | 8/2002 | Logan |
| 2002/0143530 | A1 | 10/2002 | Pitman et al. |
| 2003/0005430 | A1 | 1/2003 | Kolessar |
| 2003/0018978 | A1 | 1/2003 | Singal et al. |
| 2003/0066084 | A1 | 4/2003 | Kaars |
| 2003/0093810 | A1 | 5/2003 | Taniguchi |
| 2003/0231868 | A1 | 12/2003 | Herley |
| 2004/0073916 | A1 | 4/2004 | Petrovic et al. |
| 2005/0144133 | A1 | 6/2005 | Hoffman et al. |
| 2005/0149405 | A1 | 7/2005 | Barnett et al. |
| 2006/0195861 | A1 | 8/2006 | Lee |

FOREIGN PATENT DOCUMENTS

| | | |
|---|---|---|
| EP | 0243561 | 4/1986 |
| EP | 0535893 | 4/1993 |
| GB | 2170080 | 7/1986 |
| GB | 2260246 | 4/1993 |
| GB | 2292506 | 2/1996 |
| JP | 7059030 | 3/1995 |
| JP | 9009213 | 1/1997 |
| WO | 8909985 | 10/1989 |
| WO | 9411989 | 5/1994 |
| WO | 02073593 | 9/2002 |
| WO | 041109 | 5/2005 |

OTHER PUBLICATIONS

International Search Report issued in connection with PCT Application No. PCT/US04/18205, mailed on Feb. 12, 2007, 3 pages.

International Searching Authority, Written Opinion issued in connection with PCT/US05/17175, mailed on Sep. 19, 2005, 4 pages.

United States Patent and Trademark Office, Office Action issued in connection with U.S. Appl. No. 11/558,787 mailed on Nov. 28, 2008, 20 pages.

United States Patent and Trademark Office, Office Action issued in connection with U.S. Appl. No. 11/559,787 mailed on Jun. 16, 2009, 20 pages.

International Preliminary Report on Patentability, issued in connection with PCT/US2005/17175, mailed on Nov. 23, 2006, 5 pages.

International Preliminary Report on Patentability, issued in connection with PCT/US04/18205, mailed on Jul. 7, 2009, 5 pages.

International Searching Authority, Written Opinion issued in connection with PCT/US04/18205, mailed on May 29, 2009, 4 pages.

"Digital Audio Watermarking," Audio Media, Jan./Feb. 1998, pp. 56, 57, 59, 61.

United States Patent and Trademark Office, Office Action issued in connection with U.S. Appl. No. 11/404,276, mailed on Mar. 23, 2009, 14 pages.

International Search Report, Written Opinion issued in connection with PCT Application No. PCT/US/04/18205, mailed on Feb. 12, 2007, 5 pages.

International Search Report, issued in connection with PCT/US05/17175, mailed on Sep. 19, 2005, 4 pages.

United States Patent and Trademark Office, Notice of Allowance issued in connection with U.S. Appl. No. 11/404,276, mailed on Sep. 3, 2009, 15 pages.

* cited by examiner

“METHODS AND APPARATUS FOR IDENTIFYING AUDIO/VIDEO CONTENT USING TEMPORAL SIGNAL CHARACTERISTICS”

RELATED APPLICATIONS

This application is a continuation U.S. patent application Ser. No. 11/404,276, entitled "METHODS AND APPARATUS FOR IDENTIFYING AUDIO/VIDEO CONTENT USING TEMPORAL SIGNAL CHARACTERISTICS" and filed on Apr. 14, 2006, which is a continuation of PCT Patent Application Serial No. PCT/US2004/018205, entitled "METHODS AND APPARATUS FOR IDENTIFYING AUDIO/VIDEO CONTENT USING TEMPORAL SIGNAL CHARACTERISTICS" and filed on Jun. 8, 2004, which claims priority from U.S. Provisional Patent Application No. 60/512,507, entitled "METHODS AND APPARATUS FOR IDENTIFYING AUDIO/VIDEO CONTENT USING TEMPORAL CHARACTERISTICS OF AUDIO FEATURES" and filed on Oct. 17, 2003, the entire disclosure of which is incorporated by reference herein in its entirety. This application contains subject matter related to that disclosed in U.S. Provisional Patent Application No. 60/511,838, entitled "AUDIO SIGNATURE APPARATUS AND METHODS," the disclosure of which is incorporated by reference herein in its entirety. Additionally, this application contains subject matter related to that disclosed in International Patent Application No. PCT/US04/10562, entitled "AUDIO SIGNATURE APPARATUS AND METHODS," the disclosure of which is incorporated by reference herein in its entirety.

TECHNICAL FIELD

The present disclosure relates generally to identifying audio/video content and, more specifically, to methods and apparatus for identifying audio/video content using temporal signal characteristics.

BACKGROUND

The metering of audio/video content (e.g., television programs, radio programs, etc.) is typically performed by collecting consumption records (e.g., viewing records) or other consumption information from a group of statistically selected households. These viewing records are typically generated by identifying the audio/video content displayed in these households.

Some techniques for identifying displayed audio/video content are based on the use of audio and/or video signatures. In general, signature-based audio/video content identification techniques use one or more characteristics of presented (but not yet identified) audio/video content to generate a substantially unique signature (e.g., a series of digital values, a waveform, etc.) for that content. The signature information for the content being presented or rendered is then typically compared to signature information generated for known audio/video content. When a substantial match is found, the audio/video content can, with a relatively high probability, be identified as the known audio/video content having substantially matching signature information.

Although the use of signatures to identify consumed audio/video content is growing, known computationally efficient signature-based program identification techniques are not sufficiently reliable because these known techniques typically ignore important distinguishing characteristics of the audio/video signal. As a result, such known techniques may limit or prevent the identification of audio/video content and/or may result in an incorrect identification of that content.

DETAILED DESCRIPTION

For purposes of clarity, the following discussion describes methods and apparatus for identifying audio/video content using temporal characteristics of an audio signal. However, the methods and apparatus described herein may be extended and/or modified to use temporal characteristics of any signal associated with the audio/video content. For example, temporal characteristics of a video signal and/or a digital signal may be used instead of the example audio signal described herein.

Figure 1:
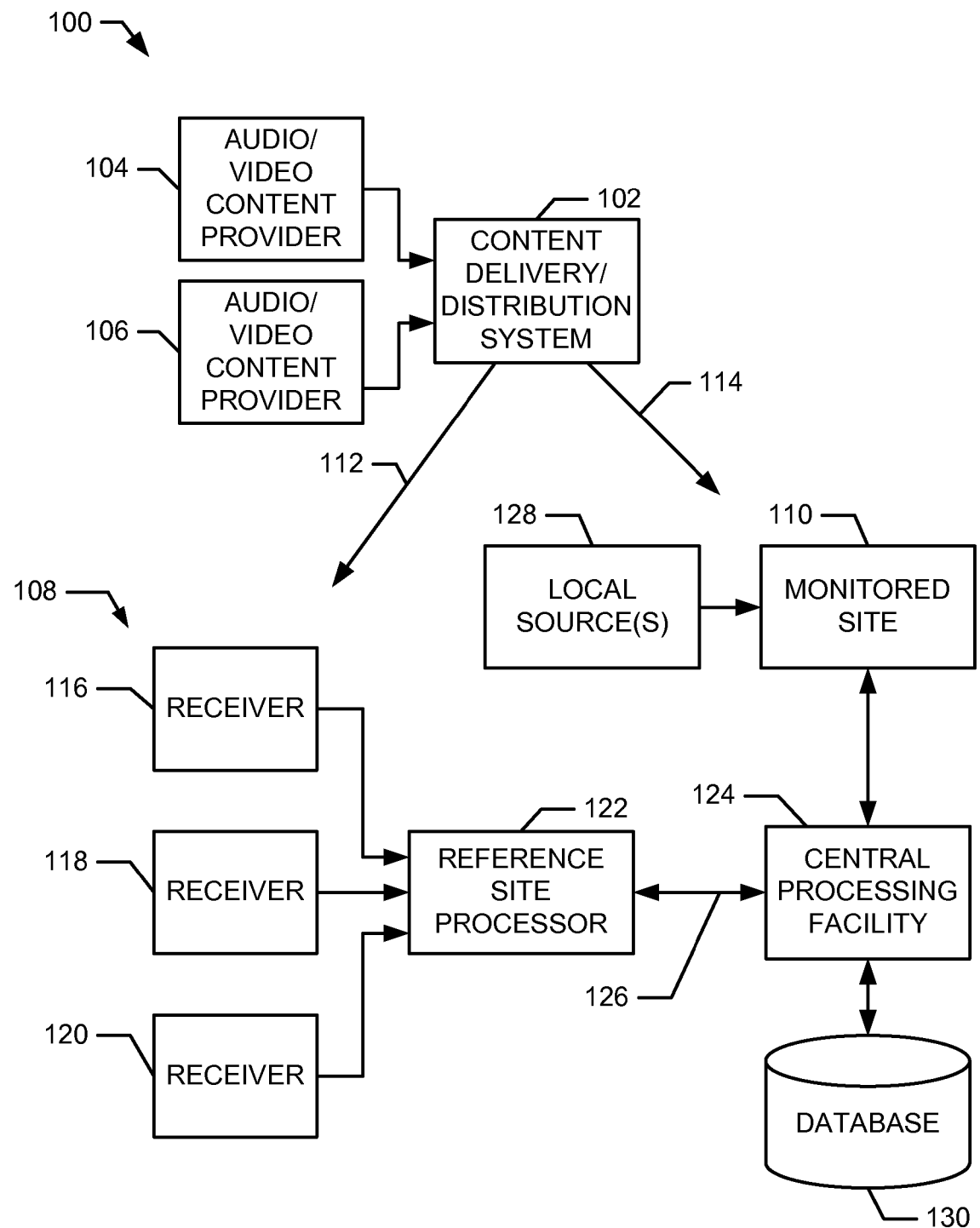
FIG. 1 is a block diagram of an example system within which the audio/video content identification apparatus and methods described herein may be implemented.

FIG. 1 is a block diagram of an example system 100 within which the audio/video content identification apparatus and methods described herein may be implemented. The example system 100 shown in FIG. 1 includes a content delivery/distribution system 102 that receives video and/or audio content from a plurality of audio/video content providers 104 and 106. The content delivery/distribution system 102 may be any form of audio and/or video content delivery/distribution system. For example, the content delivery/distribution system 102 may include a radio broadcast station, a television broadcast station, a point-to-point network, a multipoint network, etc. The audio/video content providers 104 and 106 may provide media content such as television programs, advertisements, audio (e.g., radio) programs, still image information (e.g., web pages), etc. in known manners to the content delivery/distribution system 102. The content delivery/distribution system 102 may transmit one or more media signals containing digital and/or analog audio/video content information to a reference site 108 and at least one monitored site 110 via respective communication paths or links 112 and 114.

The communication paths or links 112 and 114 may include any combination of hardwired or wireless links such as, for example, satellite links, wireless land-based links, cable links, the Internet, etc. The signals conveyed via the links 112 and 114 may contain multi-program analog signals and/or digital data streams, which are commonly employed with existing broadcast systems as well as other types of audio/video content delivery/distribution systems.

As shown in FIG. 1, the reference site 108 may include a plurality of receivers (e.g., set-top boxes or the like) 116, 118 and 120 that simultaneously demodulate, demultiplex and/or decode audio, video and/or other information received via the communication link 112 from the content delivery/distribution system 102. In one example, each of the receivers 116, 118 and 120 receives audio information associated with a different portion of the audio/video content (e.g., a different program) that is currently being transmitted (e.g., broadcast) and provides the audio information to a reference site processor 122. For example, the receiver 116 may provide audio information associated with a first program while the receivers 118 and 120 provide audio information associated with respective second and third programs. In any case, the reference site processor 122 is configured to control and/or has information indicating to which portion of the audio/video content (e.g., which channel, program, etc.) conveyed via the link 112 each of the receivers 116, 118 and 120 is currently tuned.

In general, the reference site processor 122 includes the apparatus and methods described herein for collecting or generating reference signature information for a plurality of simultaneously broadcast programs. The reference site processor 122 sends the generated or collected reference signature information to a central processing facility 124 via a communication link 126. In turn, the central processing facility 124 may store the reference signature information in a database 130 and, as described in greater detail below, may process the reference signature information together with information received from the reference site processor 122 to generate information related to the consumption of audio/video content.

The monitored site 110 could be, for example, a statistically selected home, business, etc. containing a television, a radio, a computer, etc. However, it should be recognized that, while the monitored site 110 is depicted in FIG. 1 as receiving audio/video content from a remotely situated content delivery/distribution system 102 (e.g., a broadcast station) via the communication link 114, the monitored site 110 may alternatively or additionally receive audio/video content from one or more local audio/video content delivery systems or devices 128. The local sources 128 may include one or more DVRs, DVD players, VCRs, etc. In addition, while the example system 100 shown in FIG. 1 depicts a single monitored site (i.e., the monitored site 110), multiple monitored sites may receive audio/video content via the link 114 and may be communicatively coupled to the central processing facility 124.

Figure 2:
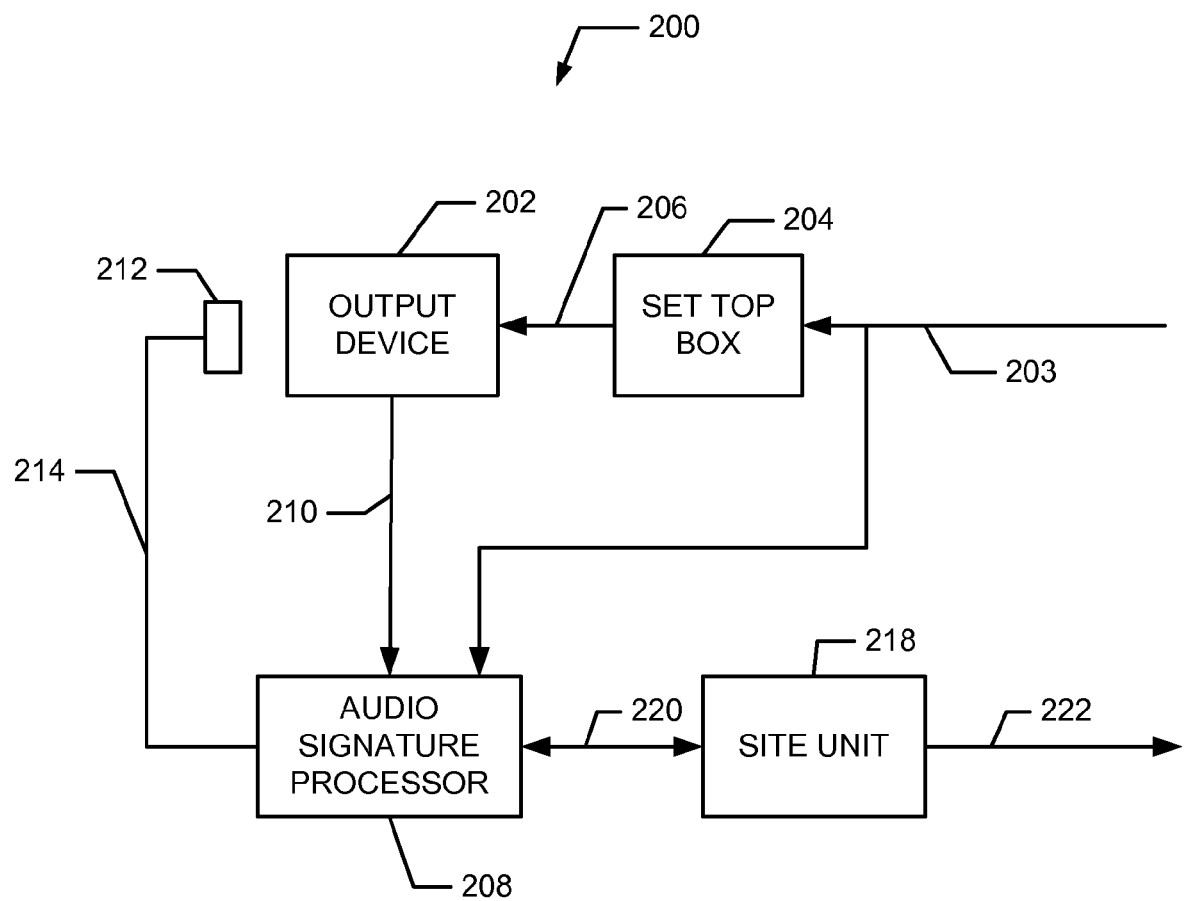
FIG. 2 is a block diagram of an example manner in which the monitored site of FIG. 1 may be implemented.

FIG. 2 is a block diagram of an example system 200 that may be used to implement the monitored site 110 of FIG. 1. As shown in FIG. 2, the example system 200 includes a media delivery, presentation or output device 202 such as, for example, a television or a video monitor that receives an audio/video content signal 203, which may be derived directly or indirectly via the communication link 114 (FIG. 1). For example, the audio/video content signal 203 may be provided by a low noise block coupled to a satellite receiving dish in the case where the link 114 (FIG. 1) is a satellite communication link. A receiver, decoder or set-top box 204 may be serially imposed between the audio/video content signal 203 received via the link 114 and the output device 202. For example, in the case where the audio/video content signal 203 received via the link 114 is a digital satellite or cable television transmission, the set-top box 204 demodulates the broadcast signal, demodulates multi-program data streams and selectively parses video and/or audio data packets associated with a desired channel and/or program. The selected data packets are processed to form an output signal 206 that can be processed and output (e.g., played, displayed, or otherwise presented) by the output device 202. For example, in the case where the output device 202 is a television, the output signal 206 may be a composite video signal, an S-video signal, a red, green, blue (RGB) signal, or any other displayable or renderable video signal applied to the appropriate input(s) of the output device 202. In the case where the audio/video content signal 203 received via the link 114 is a conventional analog television transmission or signal, the set-top box 204 may not be required and the audio/video content signal 203 may be directly coupled to the output device 202 (e.g., directly coupled to UHF/VHF inputs). In addition to signal processing functions, the set-top box 204 may also perform access control functions such as, for example, determining the audio/video content to which a user of the example system 200 is permitted access to based on subscription status or subscription information associated with the example system 200, generating displayable program guide information, etc.

The example system 200 also includes an audio signature processor 208 that may be configured to perform audio signature collection or generation, comparison and/or signature match detection functions to identify the audio/video content (e.g., what channel, program, etc.) presented or delivered by the output device 202. More specifically, the audio signature processor 208 receives the audio/video content signal 203 and an audio output signal 210, which may be provided directly by the output device 202. The audio output signal 210 contains audio information associated with the audio/video content currently consumed via or presented by the output device 202. For example, in the case where the audio/video content signal 203 received via the link 114 is delivered via a broadcast signal, the audio information provided by the audio output signal 210 may be associated with a television channel or program to which the example system 200 is currently tuned. Alternatively, the audio signature processor 208 may be coupled to an acoustic transducer 212 such as, for example, a microphone that is proximate to an acoustic output device (e.g., a speaker) associated with the output device 202. In that case, the acoustic transducer 212 supplies an audio output signal 214 containing information associated with the audio/video content currently presented by the output device 202 instead of, or in addition to, the audio output signal 210.

As described in greater detail below, the audio signature processor 208 generates audio/video content signature information, and may also collect or generate reference signature information from the audio/video content signal 203 received via the link 114. In some examples, the audio signature processor 208 sequentially generates reference signatures for programs, channels or, more generally, audio/video content extracted or otherwise derived from the audio/video content signal 203 and compares the reference signatures to the signature information associated with the audio/video content currently being consumed via the output device 202. If the comparison of reference signature information to the signature information associated with the audio/video content currently being consumed yields at least a substantial match, the audio signature processor 208 may identify the audio/video content currently being consumed as the audio/video content (e.g., the channel or program) associated with the reference signature information to which the currently viewed audio/video content signature information substantially matched.

The audio signature processor 208 is coupled to a site unit 218 via a communication link or connection 220. The audio signature processor 208 periodically or continuously sends consumption information (e.g., audio/video content, channel and/or program information) associated with audio/video content presented by or consumed via the output device 202 to the site unit 218. In turn, the site unit 218 processes the consumption information it receives from the audio signature processor 208 and sends, for example, consumption records or information to a central facility such as, for example, the central processing facility 124 of FIG. 1, via a communication link 222. The communication link 222 may include one or more wireless communication links (e.g., cellular, satellite, etc.), hardwired communication links (e.g., phone lines), or any other combination of communication hardware and technology platforms that employ any desired combination of communication protocols.

While FIG. 2 depicts the audio signature processor 208 as being located at a monitored site, some or all of the functions of the audio signature processor 208 can be distributed among a plurality of physical locations. For instance, as discussed in greater detail in connection with the example system shown in FIG. 4 below, the reference signature generation function, the signature comparison function and/or the signature match detection function may be performed by different physical systems, some or all of which may be located in different physical locations.

Figure 3:
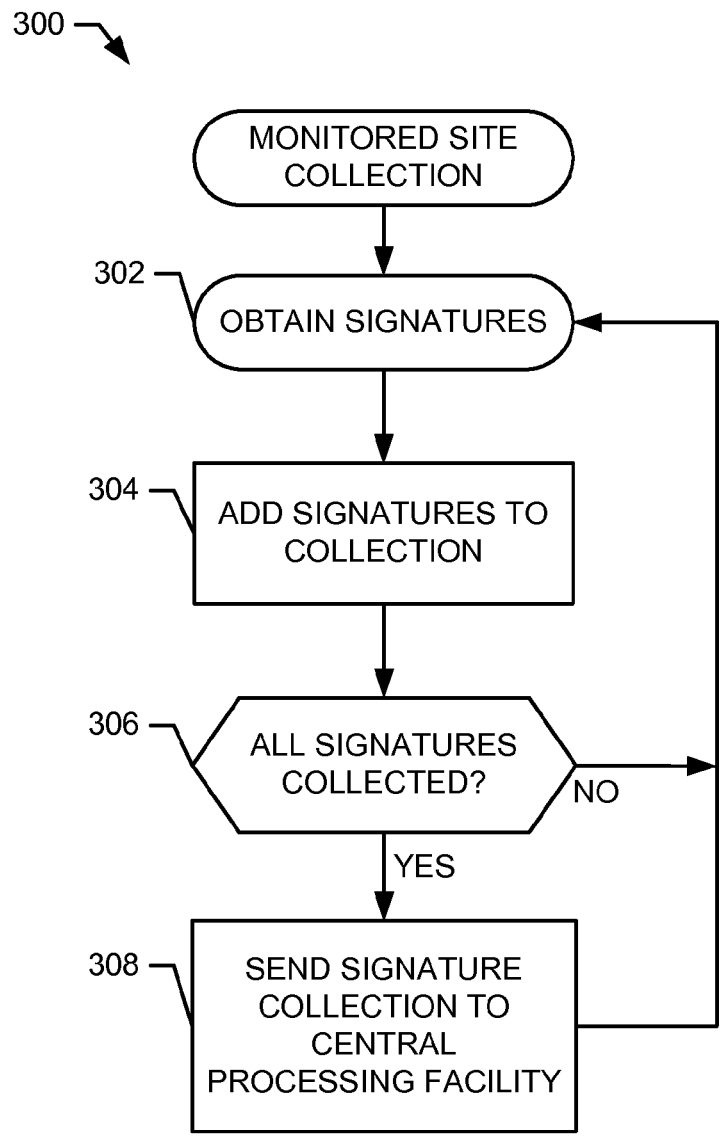
FIG. 3 is a flow diagram depicting an example manner in which the example monitored site of FIG. 2 may be configured to generate and collect signatures.

FIG. 3 is a flow diagram that depicts an example manner in which the example monitored site 200 of FIG. 2 may be configured to generate and collect signatures. Initially, the audio signature processor 208 (FIG. 2) obtains (e.g., generates, collects, etc.) signatures or signature information from a plurality of signals (e.g., the audio output signals 210 and/or 214, and the reference signal 203) (block 302). As described in greater detail in connection with FIG. 5 below, the signatures output by the audio signature processor 208 (FIG. 2) are sent to the site unit 218 (FIG. 2) via the communication link or connection 220 (FIG. 2). The site unit 218 adds the signatures, received from the audio signature processor 208, to a collection of signatures (block 304). Such a collection of signatures may be implemented using a database file, a text file, a serialized data structure, or one (or any combination) of many well-known data storage mechanisms or techniques. The signatures stored in the collection may be time stamped and stored along with other consumption information such as, for example, channel numbers, program identification information, etc.

If the site unit 218 (FIG. 2) determines that all the required signatures have not been collected (block 306), the site unit 218 (FIG. 2) returns control to the audio signature processor 208 (FIG. 2) and waits for the additional signatures to be obtained (block 302). On the other hand, if the site unit 218 (FIG. 2) determines that all required signatures have been collected (block 306), the site unit 218 (FIG. 2) sends the collection of signatures to the central processing facility 124 (FIG. 1) via the link 222 (FIG. 2) (block 308). The site unit 218 (FIG. 2) may determine at block 306 whether all signatures have been collected by using a time limit, such as a number of minutes, hours, days, weeks, months, etc, to delimit when all signatures that have been collected are ready to be sent to the central processing facility 124. After sending the collection of signatures at block 308, the site unit 218 (FIG. 2) may return control to block 302 and continue to obtain additional signatures.

While FIG. 3 depicts an example manner by which signatures are collected or generated for a period of time and then sent in groups to the central processing facility 124 (FIG. 1), other manners of conveying signature information to the central processing facility 124 (FIG. 1) may be used instead. For example, signatures may be collected and conveyed to the central processing facility 124 (FIG. 1) on a continuous basis (e.g., on a streaming basis) rather than in groups sent on a periodic basis. However any other suitable manner of conveying signatures may be used instead. Additionally, as noted above in connection with FIG. 1, the central facility 124 (FIG. 1) may perform statistical analyses using the collected signatures to derive audio/video content consumption behavior information, or any other desired information, therefrom.

Figure 4:
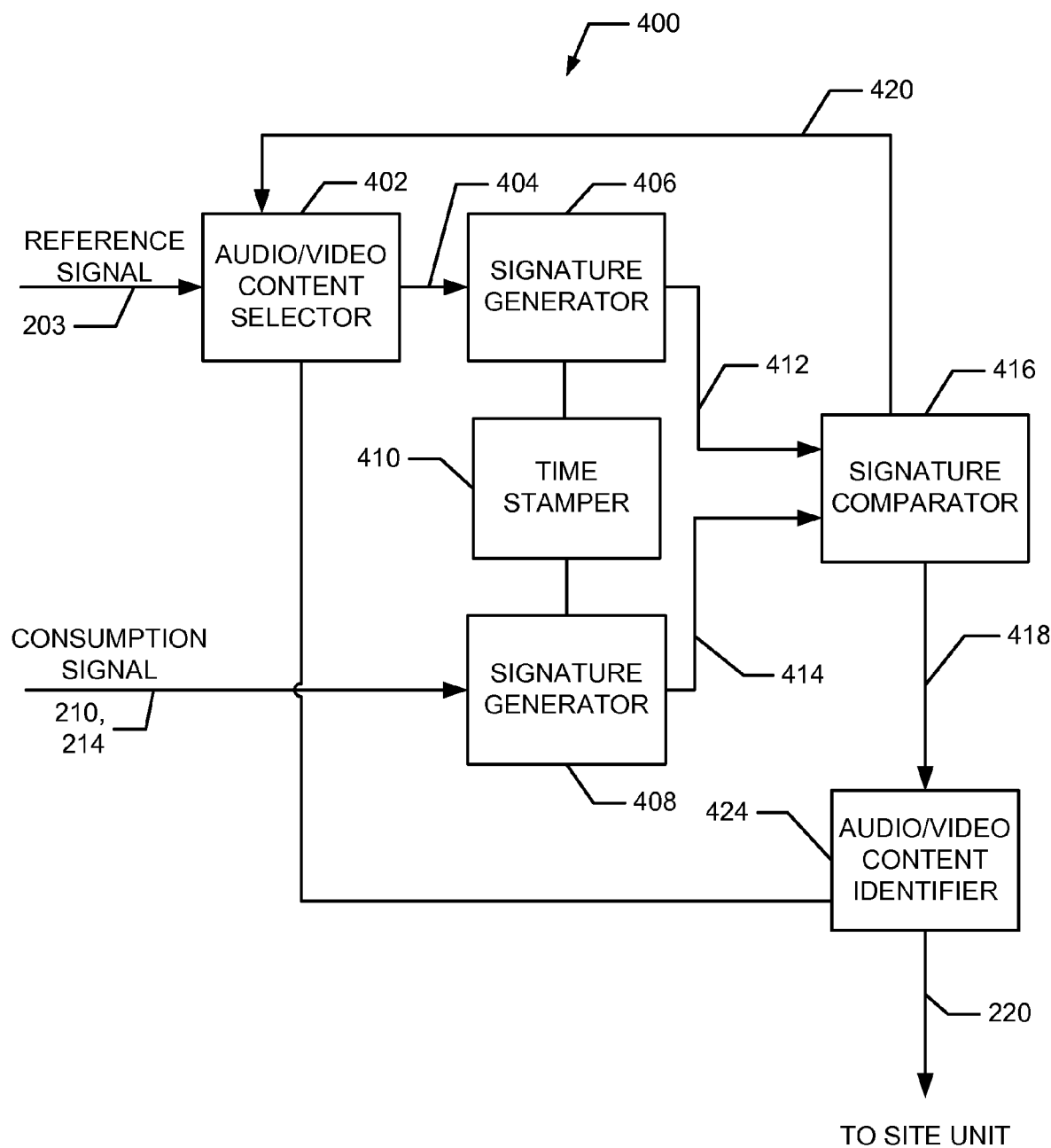
FIG. 4 is a block diagram depicting an example manner in which the audio signature processor of FIG. 2 may be implemented.

FIG. 4 is a more detailed block diagram that depicts an example manner in which the audio signature processor 208 shown in FIG. 2 may be implemented. The example audio signature processor 400 of FIG. 4 includes an audio/video content selector 402 (e.g., a scanning tuner) that receives the audio/video content signal 203 (e.g., the reference signal), which may contain a plurality of channels and audio and/or video programs available for consumption (e.g., viewing, listening, etc.), and selects a portion of the audio/video content contained therein (e.g., a channel, program, etc.) for further processing. In particular, in the case where the audio/video content signal 203 is a multi-program analog signal, the audio/video content selector 402 may vary a demodulator mixing frequency to selectively tune to particular channels and programs. On the other hand, if the audio/video content signal 203 is a multi-program digital data stream, the audio/video content selector 402 may include digital receiver functions that demodulate, demultiplex and selectively parse the data stream to extract audio and/or video data packets associated with particular channels or programs. In either case, the techniques for processing such multi-program analog signals and digital signals are well known and, thus, are not described in greater detail herein.

In general, the audio/video content selection process performed by the audio/video content selector 402 results in the sequential generation of signature information for a plurality of channels and/or audio/video programs. Also, generally, the audio/video content selection process (as described in greater detail below in connection with FIG. 5) continues until the audio signature processor 400 determines that a substantial match has been identified (i.e., that the audio/video content currently being consumed via the output device 202 (FIG. 2) can be identified with a relatively high degree of certainty), or until the audio signature processor 400 determines that a substantial match cannot be identified (e.g., all available audio/video content has been selected, processed to form audio signatures and none of those audio signatures substantially matches the signature information of the audio/video content currently being consumed). In one example, the audio/video content selection performed by the audio/video content selector 402 may be based on a predetermined numerical sequence (e.g., a sequence of channel numbers or program numbers). In another example, the audio/video content selection may be based on a probability of matching. For example, the audio/video content selector 402 may select channels associated with recently consumed audio/video content. Additionally or alternatively, the audio/video content selector 402 may select channels based on the historical frequency with which audio/video content has been consumed via those channels.

The audio/video content selector 402 outputs an audio/video content signal 404 to a signature generator 406. The audio/video content signal 404 contains audio information associated with the audio/video content currently selected by the audio/video content selector 402. The signature generator 406 processes the received audio information to generate audio signature information therefrom. As described in greater detail below, the signature generator 406 uses one or more characteristics (e.g., temporal characteristics) of one or more audio features of the signal 404 to generate signatures or signature information. For example, the signature generator 406 may use the amount of time between the peak signal magnitudes above or below a predetermined threshold, the amount of time between signal zero crossings, the temporal characteristics of signal wavelets, the temporal characteristics of signal spectral content, or any other features or characteristics of the signal 404. Regardless of the particular characteristics or audio features used by the signature generator 406 to generate signatures or signature information, the resulting signatures are substantially uniquely characteristic of the audio/video content contained within the signal 404 and, thus, may be used as a reference to compare the audio/video content currently selected by the audio/video content selector 402 to the audio/video content currently being consumed by an audience member (e.g., via the consumption signals 210 and 214).

A second signature generator 408 receives an audio output signal from the output device 202 (FIG. 2) (e.g., the audio output signal 210 or, alternatively, the signal 214 from the acoustic transducer 212). As described above, the signals 210 and 214 are associated with or representative of the audio/video content being presented by or consumed via the output device 202. The signature generator 408 is substantially the same or identical to the signature generator 406 and, thus, generates audio signatures or information in a substantially similar or identical manner to that of the signature generator 406.

As described in greater detail below in connection with FIG. 10, the signature generators 406 and 408 may each include a smoothing function to reduce or eliminate noise, spurious data, etc., thereby facilitating the matching of signature information derived from the same audio/video content delivered via different signal paths (e.g., via an output device audio output and the reference signal).

The time stamper 410 may be configured to provide time stamps that are used by the signature generators 406 and 408 to time stamp signature data generated thereby. For example, each signature may have one or more time stamps associated therewith to facilitate subsequent signature comparison operations, correlation operations, matching operations, etc. In some examples, the time stamper 410 may generate relatively coarse time intervals such as, for example, one second increments, each of which may correspond to an absolute time or a relative time based on some reference time. However, as described in greater detail below, time stamps and, thus, the time stamper 410, are not necessary to perform signature comparisons, correlations and the like.

The signature generators 406 and 408 provide respective collections of signatures or signature information 412 and 414 to a signature comparator 416. The signature comparator 416 compares the signature information 412 associated with or generated from the signal 404 to the signature information 414, which is associated with or generated from one or both of the signals 210 and 214. As noted above, the signal 404 contains audio information associated with the audio/video content (e.g., the channel, program, etc.) currently selected by the audio/video content selector 402 from the audio/video content signal 203, and the signals 210 and 214 contain audio information associated with the audio/video content currently being consumed via the output device 202 (FIG. 2).

The comparison of audio signatures or information can be performed using any known or desired technique. In one example, the signature comparator 416 calculates a sum of differences between the reference signature information 412 and the signature information associated with the audio/video content currently being consumed (i.e., the signature information 414) over a predetermined interval or time period. If the sum of differences is less than or equal to a predetermined threshold, the signature comparator 416 may provide an output signal or information 418 indicating that at least a substantial match has been detected (i.e., that the known audio/video content currently selected by the audio/video content selector 402 is substantially similar or identical to the audio/video content currently being consumed via the output device 202 (FIG. 2)).

In another example, the signature comparator 416 calculates a difference signal or an error signal and then calculates an average error, a peak or maximum error, a standard deviation of error, or any other parameters characteristic of the differences, if any, between the signature information 412 and 414. One or more of those parameters or characteristics may be compared to one or more threshold values and a determination of whether a substantial match or an identical match exists is indicated via the output 418 based on whether those parameters or characteristics are less than or greater than one or more of the threshold values.

In another example explained in detail in connection with FIGS. 10-14, the signature comparator 416 may calculate index values from elements of the signature information 414 and use the index values to access a database containing audio/video content information and/or the reference signature information 412. The database may also have time stamp data associated with each entry in the database. The signature comparator 416 may query the database using the index values and calculate a histogram of query results, which may be used by the signature comparator 416 to determine whether a substantial match exists.

The signature comparator 416 may also provide a feedback signal or information 420 to the audio/video content selector 402 to facilitate the selection of audio/video content (e.g., channels, programs, etc.) from the reference audio/video content signal 203. For example, in the event that the signature comparator 416 determines that the signature information 412 and 414 are not substantially similar or identical (i.e., the audio/video content currently selected or tuned from the reference or audio/video content signal 203 by the audio/video content selector 402 does not substantially match the audio/video content currently being consumed via the output device 202 (FIG. 2)), the feedback signal 420 may indicate a non-match condition to the audio/video content selector 402. In turn, the audio/video content selector 402 may select or tune the next portion of audio/video content (e.g., a next channel or program) in its audio/video content search or scan sequence.

An audio/video content identifier 424 is coupled to the audio signature comparator 416 and receives the match information output 418. If the audio/video content identifier 424 receives information (via the output 418) indicating that a substantial or identical match has been identified, the audio/video content identifier 424 determines the identity of the audio/video content currently being consumed via the output device 202 (FIG. 2). More specifically, the audio/video content currently being consumed via the output device 202 (FIG. 2) may be identified as a particular broadcast channel, program, website, etc.

The audio/video content identifier 424 is coupled to the site unit 218 (FIG. 2) and provides the audio/video content identification information to the site unit 218 (FIG. 2) via the communication link 220. The site unit 218 may use the audio/video content identification information provided by the audio/video content identifier 424 to generate consumption records and the like.

Figure 5:
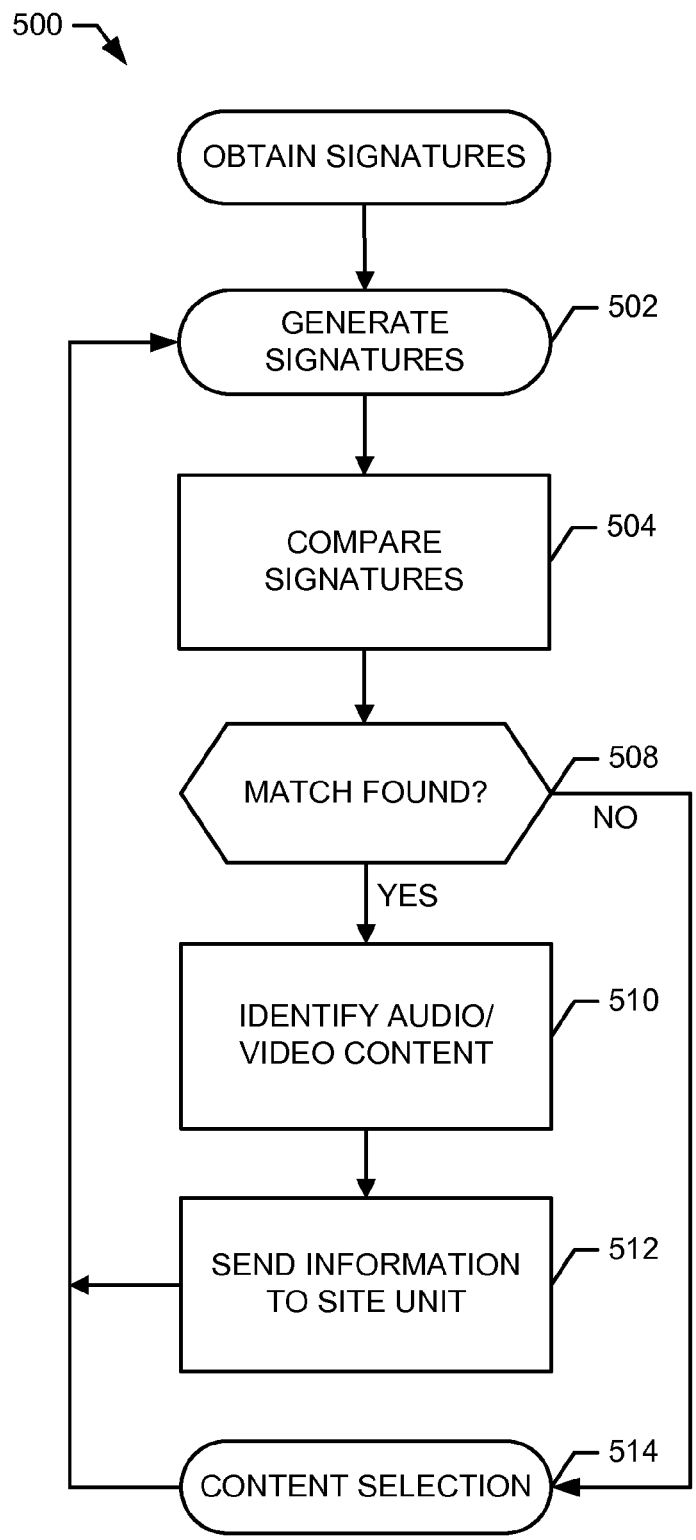
FIG. 5 is a flow diagram that generally depicts an example manner in which the audio signature processor of FIG. 4 may be configured to generate and process audio signatures.

FIG. 5 is a flow diagram that generally depicts an example manner in which the audio signature processor 400 shown in FIG. 4 may be configured to collect or generate and process audio signatures. Initially, the signature generators 406 and 408 (FIG. 4) collect or generate signatures and send the signatures to the signature comparator 416 (FIG. 4) (block 502). As described in greater detail in connection with FIG. 7 below, the signature collection or generation process (block 502) may use the characteristics of audio features such as, for example, temporal characteristics such as the times between zero crossings, the times between peak values crossing a predetermined threshold, the time varying spectral characteristics of an audio signal, etc. Regardless of the particular media signal characteristics and features that are used to collect or generate signatures or signature information, the signature comparator 416 compares signature information received from the signature generator 406 to signature information received from the signature generator 408 (block 504).

There are many well-known methods to compare signatures. One known signature comparison method may use a byte by byte comparison. Alternatively, signatures may be compared within a specific number of bits (e.g., three bits) of error. As described in greater detail below in connection with FIG. 8, an audio signal may be divided into a plurality of successive time intervals, each of which may be an equal or unequal number of seconds, minutes, etc. Signatures may be generated within the confines of these time intervals or sampling periods to facilitate efficient matching of signatures. For example, one signature per second may be generated. In such a case, a matching algorithm could match a reference signal signature (e.g., a signature derived from the audio/video content signal 203 (FIG. 4)) generated within a time interval (e.g., a one second interval) to a consumption signal (e.g., one or both of the signals 210 and 214) signature generated within that same time interval. Alternatively or additionally, the signature matching algorithm could match the reference signal signature generated within a predetermined time interval to signatures generated for one or both of the consumption signals 210 and 214 (FIG. 4) over a plurality of time intervals.

Regardless of the particular signature matching technique employed by the signature comparator 416 (FIG. 4), if the signature comparator 416 (FIG. 4) determines that a signature received from the signature generator 406 (FIG. 4) matches (either substantially or identically) a signature received from the signature generator 408 (FIG. 4) (block 508), the signature comparator 416 conveys the matching information 418 to the audio/video content identifier 424 (FIG. 4). In turn, the audio/video content identifier 424 identifies the audio/video content (e.g., the channel, program, etc.) to which the audio/video content selector 402 (FIG. 4) is currently tuned and, thus, the audio/video content currently being consumed via the output device 202 (FIG. 2) (block 510). For example, if the signature comparator 416 (FIG. 4) and the audio/video content identifier 424 (FIG. 4) are implemented using separate processor-based systems, the signature comparator 416 (FIG. 4) may convey an interrupt to the audio/video content identifier 424 (FIG. 4). Alternatively, if the signature comparator 416 and the audio/video content identifier 424 are implemented within the same processor-based system, a software function call may be used to indicate to the audio/video content identifier 424 (FIG. 4) that a matching condition has occurred within the signature comparator 416 (FIG. 4). After the audio/video content has been identified (block 510), the audio/video content identifier 424 (FIG. 4) sends the signatures or signature information along with any other desired audio/video content identification information (e.g., program identifiers, time stamps, etc.) to the site unit 218 (FIG. 2) via the communication link or connection 220 (FIG. 2) (block 512).

On the other hand, if at block 508 the signature comparator 416 (FIG. 4) determines that a signature received from the signature generator 406 (FIG. 4) does not match a signature received from the signature generator 408 (FIG. 4), the signature comparator 416 (FIG. 4) transfers control to block 514 to invoke an audio/video content selection process, which is described in greater detail in connection with FIG. 6. After the audio/video content selector 402 (FIG. 4) performs the audio/video content selection process at block 514, control returns to block 502, at which the signature generators 406 and 408 (FIG. 4) again generate signature information or signatures.

Figure 6:
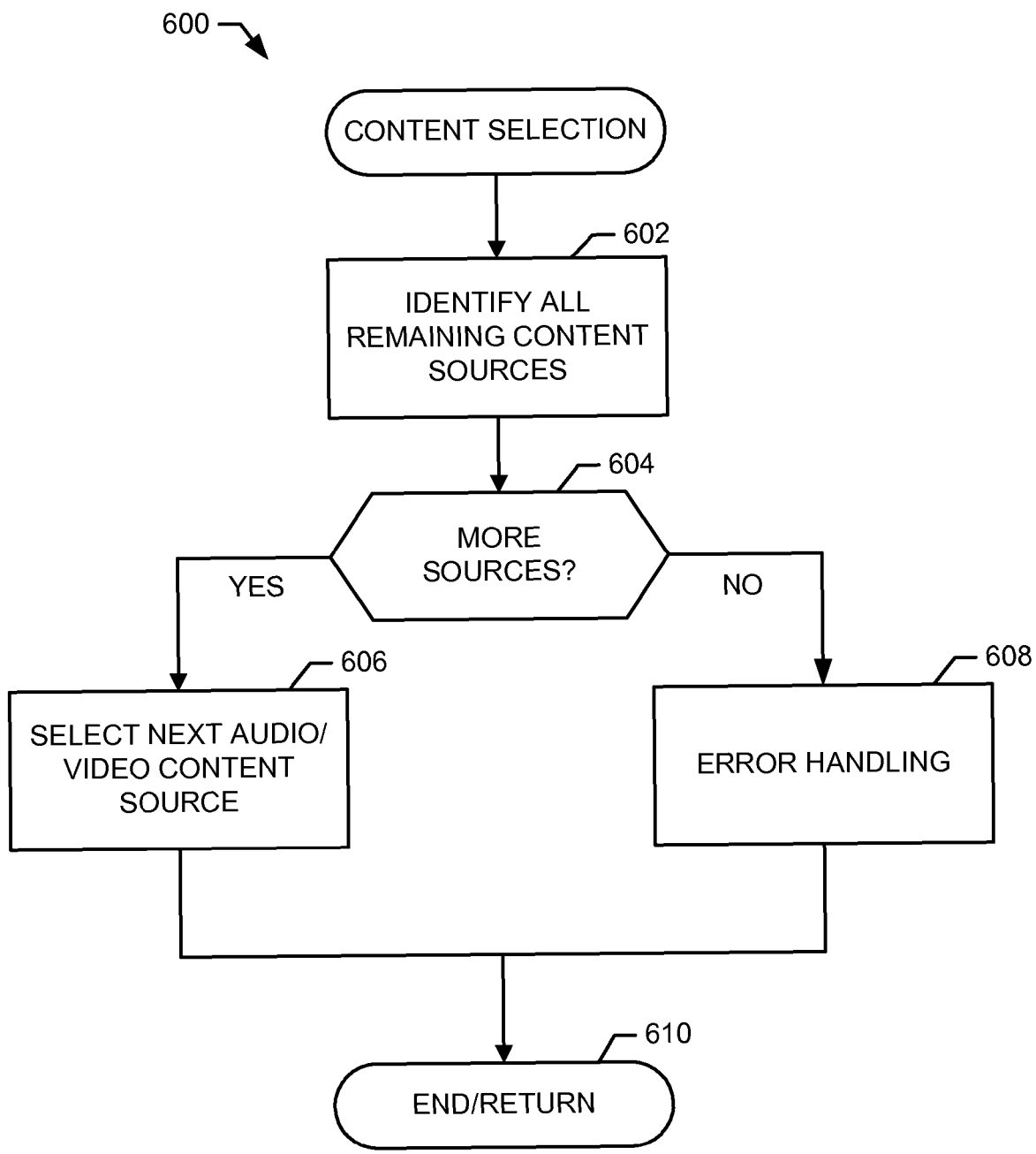
FIG. 6 is a flow diagram depicting an example manner in which the audio/video content selector of FIG. 4 may be configured.

FIG. 6 is a flow diagram that depicts an example manner in which the audio/video content selector 402 shown in FIG. 4 may be configured to perform the audio/video content selection function described in connection with block 514 of FIG. 5. Initially, the audio/video content selector 402 (FIG. 4) identifies all audio/video content portions (e.g., channels, programs, etc.) that have not yet been compared to the signal(s) (e.g., the signals 210 and 214) that are associated with the audio/video content currently being consumed via the output device 202 (FIG. 2) (block 602). If the audio/video content selector 402 (FIG. 4) determines that the reference audio/video content signal 203 contains audio/video content that has not yet been compared to the consumption signal 210, 214 (block 604), the audio/video content selector 402 (FIG. 4) selects another portion of audio/video content (e.g., tunes to another broadcast channel or program) (block 606) and then returns control or ends (block 610). The audio/video content selector 402 (FIG. 4) may, for example, determine if broadcast channels exist that have not yet provided audio/video content for comparison to the consumption signal (e.g., the signals 210 and 214) by scanning or searching a series of broadcast channels in a predetermined sequence. If the audio/video content selector 402 determines at block 604 that all of the audio/video content supplied on each of the available broadcast channels has already been compared to the audio/video content currently being consumed (e.g., the signals 210 and 214), the audio/video content selector 402 (FIG. 4) may perform one or more error handling techniques (block 608) and then return control or end (block 610).

Figure 7:
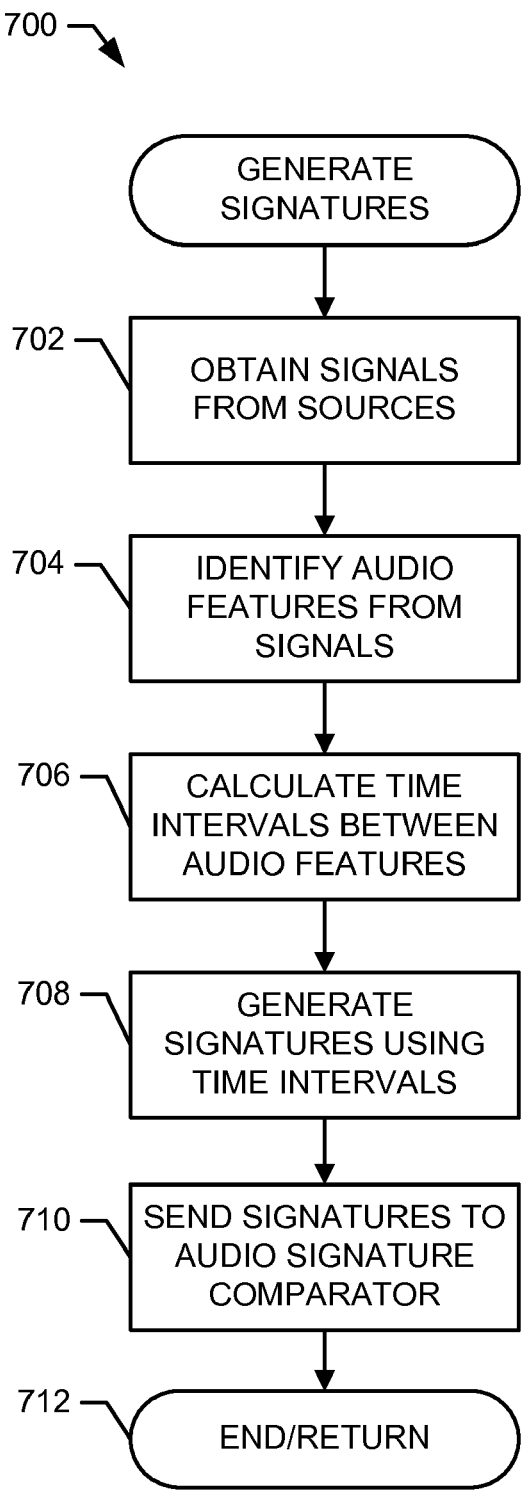
FIG. 7 is a more detailed flow diagram depicting an example manner in which the signature generators of FIG. 4 may be configured to generate audio signatures.

FIG. 7 is a flow diagram that depicts an example manner in which the signature generators 406 and 408 of FIG. 4 may be configured to perform the signature generation functions described in connection with block 502 of FIG. 5. Initially, the signature generators 406 and 408 obtain signals associated with audio/video content from a plurality of audio/video content sources (block 702). In particular, the signature generator 406 (FIG. 4) obtains the signal 404 (FIG. 4), which contains audio/video content selected by the audio/video content selector 402 (FIG. 4) from the reference audio/video content signal 203 (FIG. 4). The signature generator 408 (FIG. 4) obtains one or both of the signals 210 and 214, each of which contains audio/video content associated with audio/video content currently being consumed via the output device 202 (FIG. 2). Upon obtaining the signals (block 702), the signature generators 406 and 408 (FIG. 4) identify particular audio features from their respective signals (block 704). For example, the audio features of interest may be peak signal values exceeding or falling below a predetermined threshold value, zero crossings, wavelet energies, or any other time domain (i.e. temporal) or frequency domain (i.e., spectral) feature of an audio signal. The audio features may have variable temporal characteristics that are substantially uniquely characteristic of the content of that signal, thereby enabling substantially unique signatures to be generated therefrom.

After the audio features of interest have been identified at block 704, the signature generators 406 and 408 (FIG. 4) calculate the time intervals between the audio features (block 706). For example, in the case where the audio features of interest are peak signal values above a predetermined threshold value, the time intervals are the times between those peak signal values that exceed the predetermined threshold value. The signature generators 406 and 408 use their respective time intervals (calculated at block 706) to generate signatures (block 708).

Following generation of the signatures (block 708), the signal generators 406 and 408 (FIG. 4) send their respective signatures to the audio signature comparator 416 (FIG. 4) (block 710). More specifically, the signature generator 406 (FIG. 4) sends the signatures it generates to the signature comparator 416 (FIG. 4) via the signal 412 (FIG. 4). In a similar manner, the signature generator 408 (FIG. 4) sends the signatures it generates to the audio signature comparator 416 via the signal 414 (FIG. 4). The signature generators 406 and 408 (FIG. 4) then end or return control (block 712).

Figure 8:
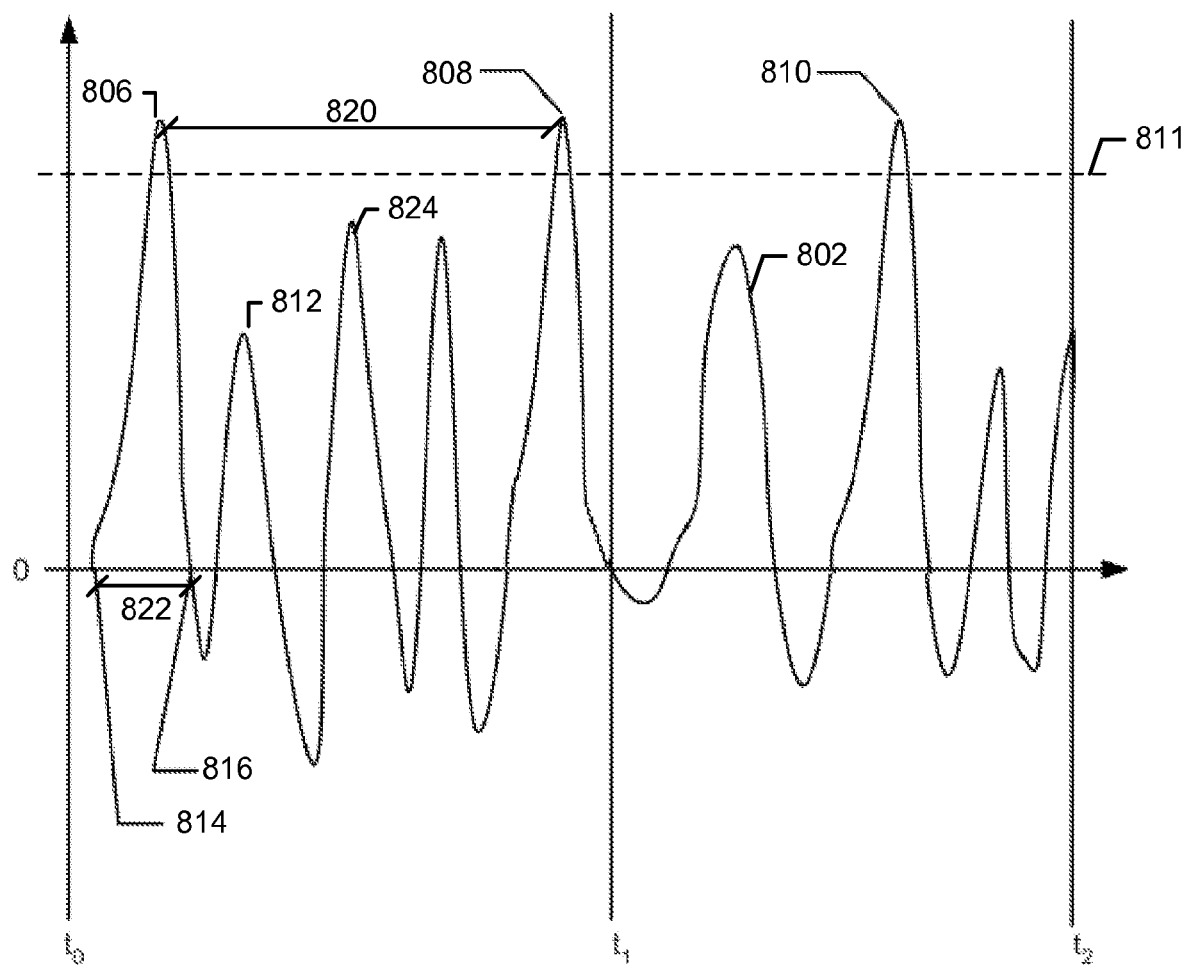
FIG. 8 is a graph depicting an example audio signal that may be processed by the example audio signature processor of FIG. 2.

FIG. 8 is a graph that depicts an example audio signal 802 that may be processed by the signature generators 406 and 408 shown in FIG. 4. The signal 802 includes a plurality of peaks 806, 808 and 810 above a threshold 811, a plurality of peaks (e.g., peaks 812 and 824) below the threshold 811, and a plurality of zero crossings, two of which are indicated at reference numerals 814 and 816.

When identifying audio features of interest at block 704 of FIG. 7, the signature generators 406 and 408 (FIG. 4) may identify the peaks 806 and 808 within a first time interval or sampling that extends from time $t_0$ to $t_1$. Likewise the peak 810 may be identified as an audio feature of interest within a second or subsequent time interval extending from $t_1$ to $t_2$. Then, when calculating the time intervals between audio features at block 706 of FIG. 7, the signature generators 406 and 408 (FIG. 4) may calculate a time interval 820 between the peaks 806 and 808 for the first time interval from $t_0$ to $t_1$ and may determine that there are an insufficient number of peaks exceeding the threshold 811 during the second or subsequent time interval running from $t_1$ to $t_2$ to enable the calculation of a peak to peak time interval for the second time interval ($t_1$-$t_2$). Time intervals having an insufficient number of peaks may instead be assigned a default value of, for example, zero. In this manner, the signature generators 406 and 408 may generate a series of time values (e.g., times between peak values above a threshold value) and may use such a series of time intervals to form a signature or signature information at block 708 of FIG. 7.

Of course, many other techniques may be employed to collect or generate signatures. For example, the signal features of interest may include a plurality of peaks below the threshold 811 and the time intervals between those peaks may be used to generate the signatures. Still further, the times between zero crossings may be used to generate signatures. For example, zero crossings 814 and 816 form a time interval 822, which may be one of a plurality of zero crossing time intervals falling within the time interval between $t_0$ and $t_1$. Such multiple time intervals within the time interval from $t_0$ to $t_1$ may be summed, averaged, used to compute a key value (e.g., a hash value) associated with a hash table, or mathematically combined in any other manner to generate a single value for the sampling interval $t_0$ to $t_1$. In a similar manner, a plurality of zero crossing time intervals within the sampling interval $t_1$ to $t_2$ may be mathematically combined. A series of such mathematically combined values (i.e., values for the sampling intervals) may thereby form a signature for the signal 802.

Figure 9:
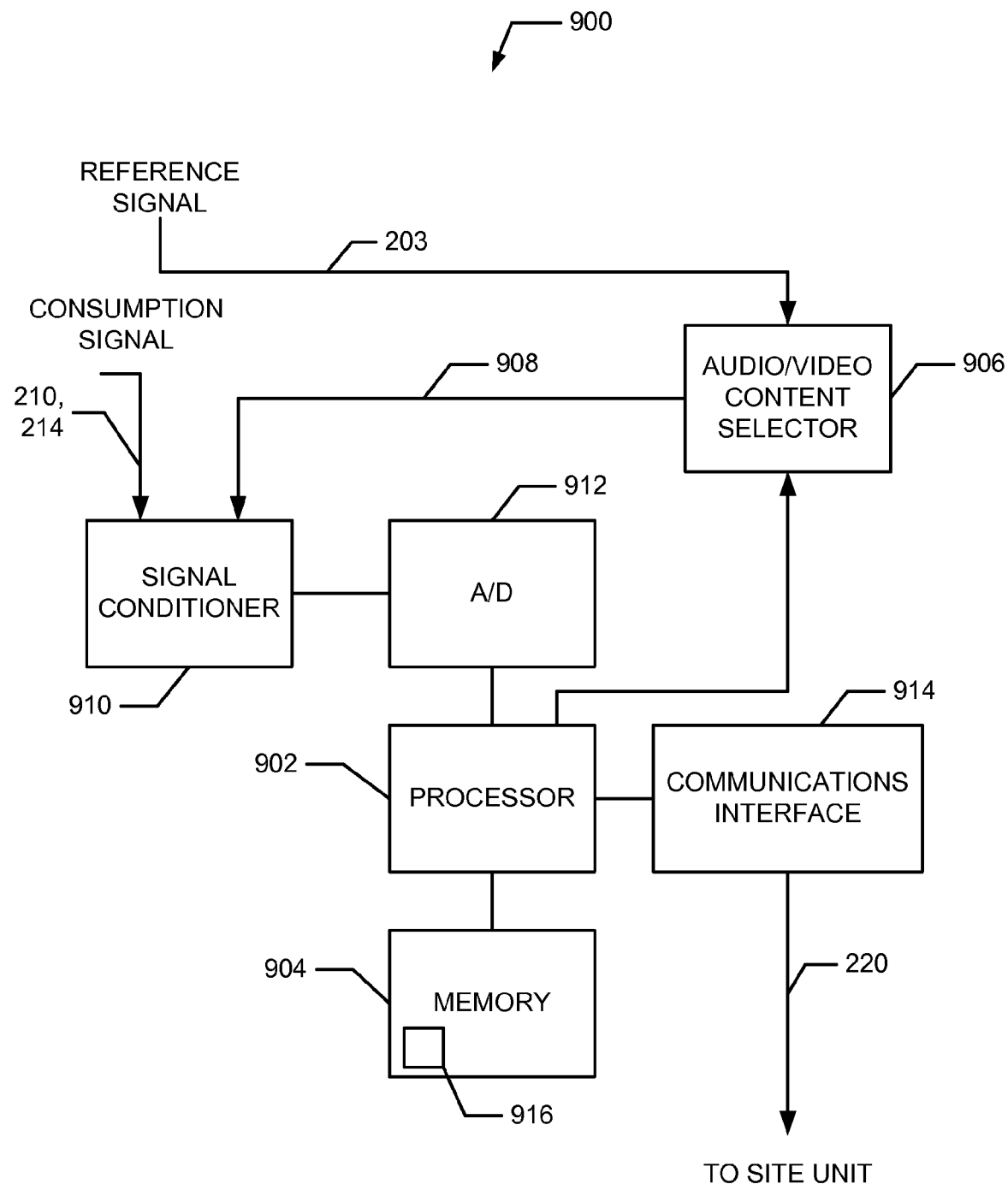
FIG. 9 is a block diagram depicting another example manner in which the audio signature processor of FIG. 2 may be implemented.

FIG. 9 is a block diagram that depicts another example manner in which the audio signature processor 208 shown in FIG. 2 may be implemented. The example audio signature processor 900 is a processor-based system that includes a processor 902 coupled to a memory 904 having software, firmware and/or any other machine readable instructions 916 stored thereon. The processor 902 executes the software, firmware and/or machine readable instructions 916 to implement substantially the same signature generation, signature comparison and audio/video content identification functions described herein.

The processor 902 may be any suitable microprocessor, microcontroller or processing unit capable of executing machine readable instructions. The memory 904 may be any desired combination of volatile and non-volatile memory including, for example, read-only memory (ROM) devices, electrically erasable programmable read only memory (EEPROM) devices, random access memory (RAM) devices, mass storage devices (e.g., disk drives for magnetic or optical media), or any other suitable storage devices.

The example audio signature processor 900 may also include an audio/video content selector 906, which may be substantially similar or identical to the audio/video content selector 402 (FIG. 4) that receives the reference signal 203. The audio/video content selector 906 is controlled by the processor 902 to scan for audio/video content (e.g., a series of broadcast channels or programs) in a predetermined sequence. As described above in connection with the audio/video content selector 402 (FIG. 4), the channel selection sequence may be based on one or more factors such as, for example, the frequency with which channels are typically consumed, the most recently consumed channels, etc. The audio/video content selector 906 outputs a signal 908 that contains audio information about a single selected portion of audio/video content (e.g., a program).

Signal conditioning circuitry 910 receives the signal 908 and one or both of the signals 210 and 214. The signal conditioning circuitry 910 may include analog and or digital circuitry for filtering (e.g., noise filtering, anti-aliasing filtering, transient filtering, 300 Hz to 3000 Hz bandpass filtering, etc.), protection circuitry (e.g., surge protection circuitry), level shifting circuitry, amplification circuitry, attenuation circuitry, or any other known or desired signal conditioning circuitry.

An analog-to-digital (A/D) converter 912 receives the audio program signals output by the signal conditioning circuitry 910. The A/D converter 912 includes at least two channels to enable the simultaneous analog-to-digital conversion of the conditioned versions of the reference channel signal 908 and the consumption signal (i.e., one or both of the signals 210 and 214).

The audio signature processor 900 also includes a communications interface 914 that enables the processor 902 to communicate with the site unit 218 (FIG. 2) via communication link or connection 220 (FIG. 2). For example, the communications interface 914 may include level shifting circuitry, bus line or signal line driver circuitry, or any other known or desired communications circuitry.

Figure 10:
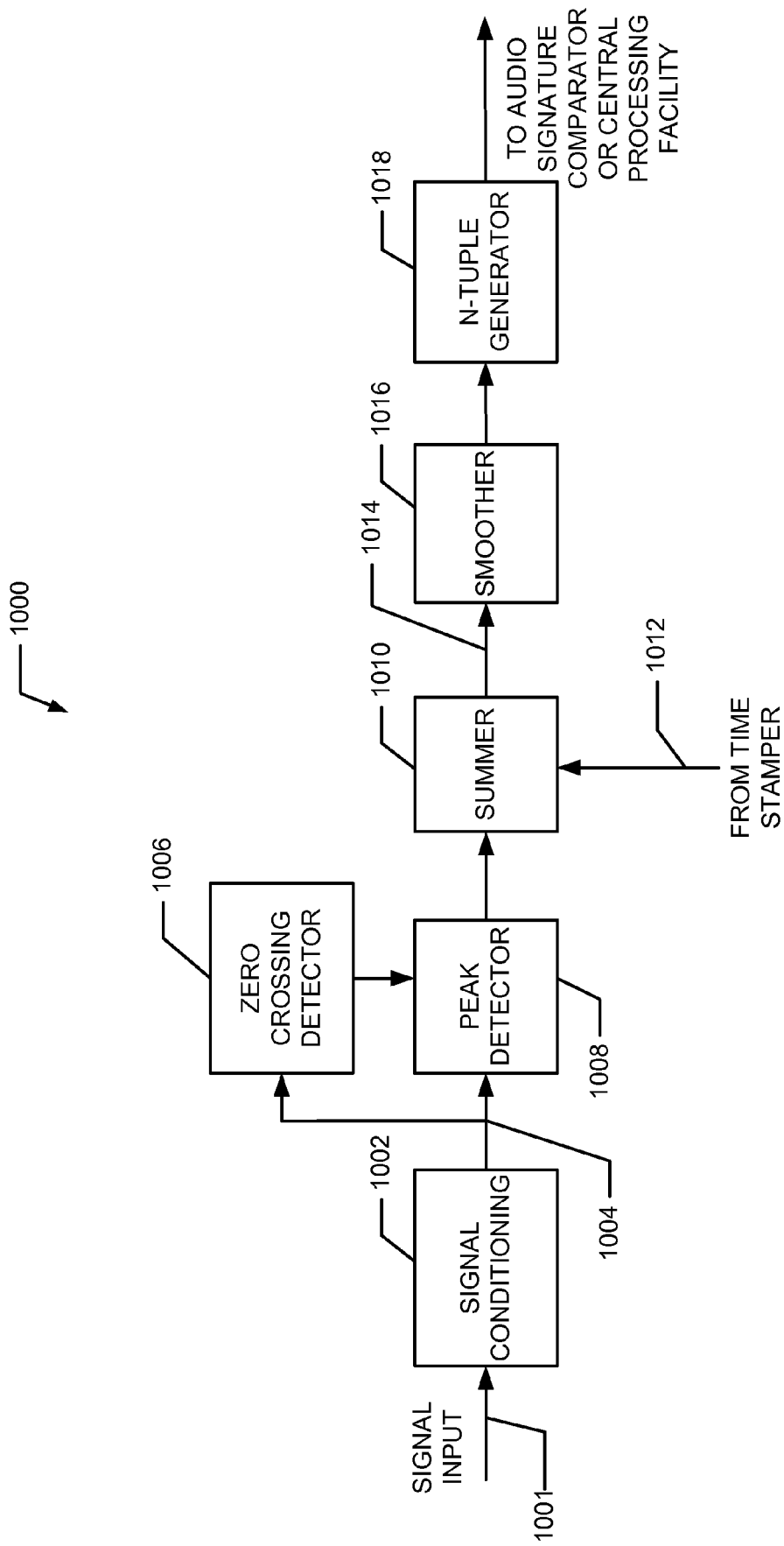
FIG. 10 is a block diagram depicting an example manner in which the audio signature generators of FIG. 4 may be implemented.

FIG. 10 is a block diagram that depicts another example manner in which the signature generators 406 and 408 shown in FIG. 4 may be implemented. The example signature generator 1000 shown in FIG. 10 receives an input signal 1001 (which may, for example, correspond to the signal 404 output by the audio/video content selector 402 and/or the consumption signals 210 and 214) via signal conditioning circuitry 1002. The signal conditioning circuitry 1002 may include analog and or digital circuitry for filtering (e.g., noise filtering, anti-aliasing filtering, transient filtering, etc.) One particularly useful filtering circuit may provide a bandpass filter characteristic from 300 Hz to 3000 Hz. Additionally or alternatively, the signal conditioning circuitry 1002 may include protection circuitry (e.g., surge protection circuitry), level shifting circuitry, amplification circuitry, attenuation circuitry, or any other known or desired signal conditioning circuitry. Of course, the signal conditioning circuitry 1002 may be eliminated from the signature generator 1000 in the event that the signals provided to the signature generator 1000 do not require conditioning.

Conditioned signal(s) 1004 output by the signal conditioning circuitry 1002 are provided to a zero crossing detector 1006 and a peak detector 1008. The zero crossing detector 1006 may use a one-shot multi-vibrator or the like to output a pulse to the peak detector 1008 each time a zero crossing occurs within the conditioned signal(s) 1004. The peak detector 1008 may be implemented using any desired peak detection circuit to detect peak signal magnitude. For example, in the case where the signals 1004 are analog signals, a diode, capacitor and bleed resistor combination may be used to detect peak value. On the other hand, in the case where the signals 1004 are digital values, the peak detector 1008 may simply retain the largest numerical value following a reset. The peak detector 1008 resets (e.g., to zero) in response to zero crossing pulses or other signals provided by the zero crossing detector 1006. As a result, the peak detector 1008 outputs a series of signal peak magnitudes, each of which occurs between successive zero crossings.

A summer 1010 receives the series of peak signal magnitudes from the peak detector 1008 and generates sums of these peak signal magnitudes for each of the predetermined time intervals or sample intervals. In one example, the summer 1010 may sum a plurality of peak magnitudes (absolute values) occurring within a predetermined number of samples (e.g., 125 samples) collected at a predetermined rate (e.g., 8000 samples per second) from the conditioned signal 1004. However, other sample sizes and sample rates may be used instead to suit the needs of a particular application. An output 1014 of the summer 1010 provides a series of positive sum values at a rate equal to the sample rate divided by the sample size for each sum. Thus, in the example where the sample rate is 8000 samples/second and the sample size per sum is 125, the output 1014 provides sums at a rate of 64 per second. Additionally, as depicted in FIG. 10, the summer 1010 may also receive a signal 1012 (e.g., time stamp values) from the time stamper 410 (FIG. 4) that enables the summer 1010 to associated time stamp values with one or more of the sums at the output 1014.

The signature generator 1000 may also include a smoother 1016 that performs a smoothing function on the series of sums output by the summer 1010 (e.g., weighted zero crossing data). For example, the smoother 1016 may perform a low pass filter function to eliminate noise and other spurious interference or signal components that may adversely affect signature match detection. One particularly useful smoothing function may be based on the formula $y(t)=a*x(t)+b*y(t-1)$, where y represents the smoothed data, x represents the sum data provided at the output 1014, and $a+b=1$. Preferably, $a=b=0.5$. However, a and b may be different values if desired to suit the needs of a particular application. A smoothing function such as the example function set forth above may be successively applied to the data multiple times (e.g., ten times) to achieve a desired smoothness.

The filtering performed by the smoother 1016 may be implemented using any desired combination of passive components (i.e., resistors, capacitors, inductors, etc.), active components (i.e., transistors, operational amplifiers, etc.) and/or digital components (i.e., digital logic, processing units, memory, etc.). There are many well-known analog and numerical (i.e., digital) filtering techniques that may be used to implement the smoother 1016 and, thus, such implementation details are not discussed in greater detail herein.

The signature generator 1018 may also include a N-tuple generator 1018 configured to receive the smoothed data (e.g., weighted zero crossing data) from the smoother 1016 and form a plurality of N-tuples from the smoothed data. The N-tuples may be of any size as determined by software and/or user input. The N-tuple generator 1018 may analyze the smoothed data and determine maxima points (e.g., peaks) in the data and a time difference between successive maxima. The N-tuple generator 1018 may form a plurality of N-tuples using the time differences between maxima points (e.g., delta times) and associate a time stamp with each N-tuple. For example, if the N-tuple generator 1018 determines the delta times are {t1, t2, t3, t4, t5, t6} and the N-tuple generator 1018 is configured to form 4-tuples, three 4-tuples are formed (e.g., {t1, t2, t3, t4}, {t2, t3, t4, t5}, and {t3, t4, t5, t6}). A person of ordinary skill in the art will readily appreciate that there are different methods to form N-tuples from the set of delta times. As shown in the above example, one method may use a sliding window that moves over the delta times and results in overlapping values between the 4-tuples (e.g., the delta times t2, t3, t4 are in the two of the 4-tuples. Other methods may result in sequential non-overlapping N-tuples.

Figure 11:
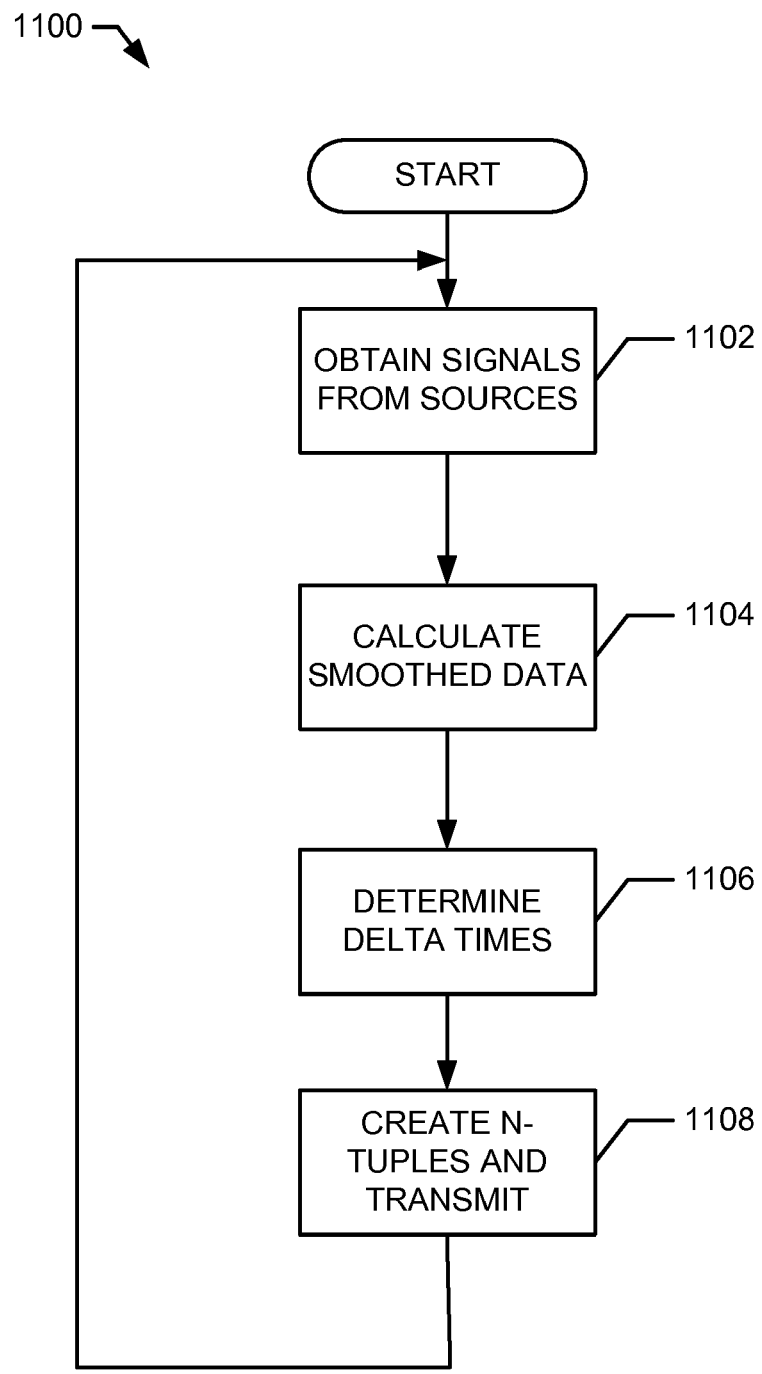
FIG. 11 is a flow diagram depicting an example manner in which the apparatus of FIG. 10 may be configured to generate audio signatures.

FIG. 11 is a flow diagram depicting an example process 1100 by which the signature generator 1000 of FIG. 10 may generate signatures. The example process 1100 begins by obtaining signals associated with audio/video content from a plurality of audio/video content sources (block 1102). In particular, the signature generator 1000 obtains signals from the signal input 1001 (FIG. 10) which may be derived directly or indirectly from the reference audio/video content signal 404 (FIG. 4) and/or from the consumption signals 210 and 214. After the signals associated with audio/video content have been received (block 1102), the example process 1100 calculates smoothed data (e.g., weighted zero crossing data) from the signal (block 1104).

Figure 12:
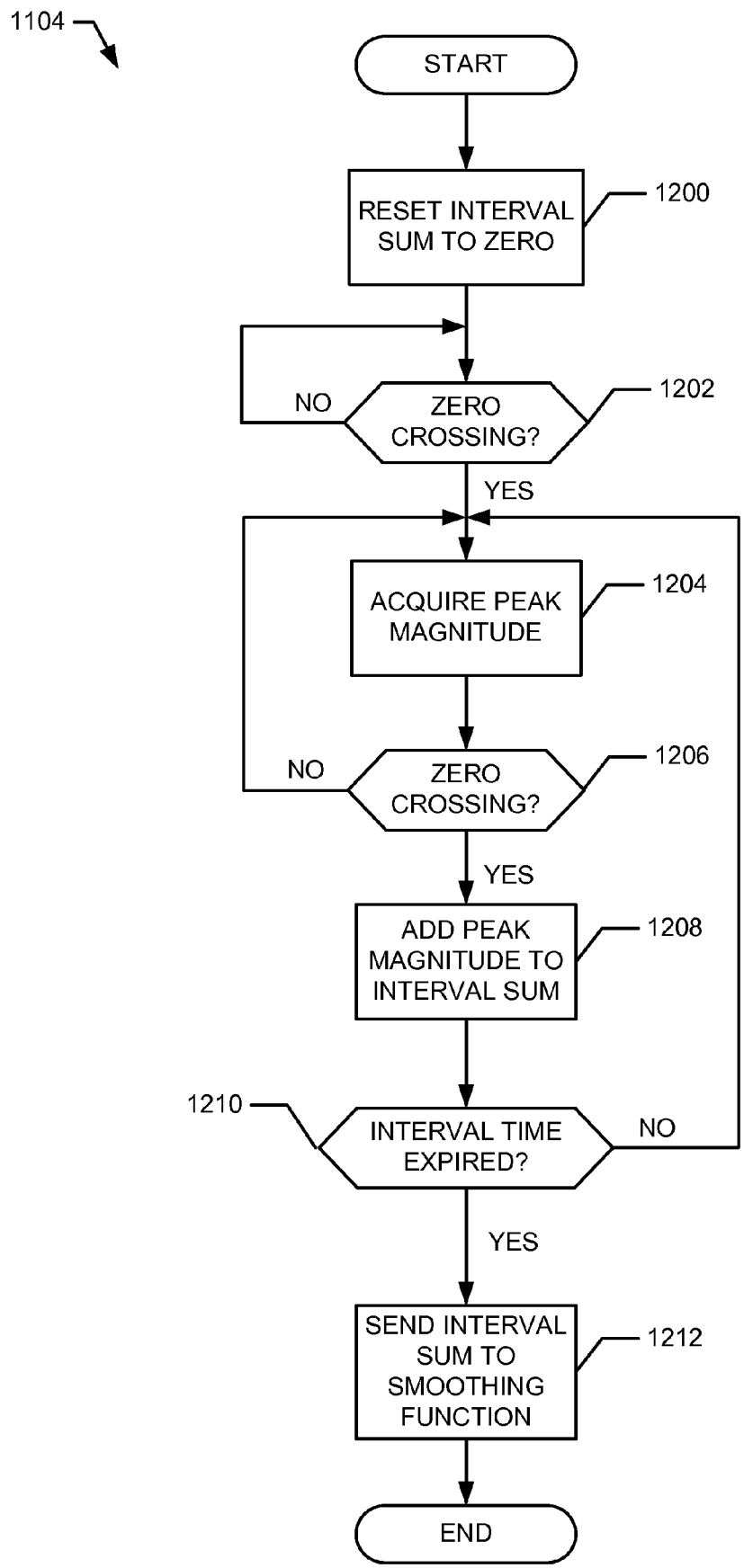
FIG. 12 is a flow diagram depicting an example manner in which the apparatus of FIG. 10 may be configured to generate smoothed data.

FIG. 12 is a flow diagram that depicts an example manner by which the signature generator 1000 shown in FIG. 10 may be configured to perform the data smoothing function described in connection with block 1104 of FIG. 11. Initially, the signature generator 1000 resets a sample interval sum to zero (block 1200) and then waits for a zero crossing of the audio signal for which a signature is to be generated (e.g., the output device audio output signal 210 and/or the signal 214) (block 1202). Upon detection of a zero crossing (block 1202), the signature generator 1000 continuously or periodically acquires the peak magnitude of the signal (block 1204) until a subsequent zero crossing is detected (block 1206). After the subsequent zero crossing is detected (block 1206), the signature generator 1000 adds the peak magnitude acquired at block 1204 to an interval sum (block 1208). The signature generator 1000 then determines if the sample interval has expired (e.g., a predetermined amount of time has elapsed, a predetermined number of samples have been acquired, etc.) (block 1210). The sample interval may be a predetermined amount of time during which peak magnitudes are summed. If the sample interval has not expired (block 1210), the signature generator 1000 returns control to block 1204. On the other hand, if the sample interval has expired, the signature generator 1000 sends the current interval sum to a smoothing function (block 1212) and then returns control to block 1106 of FIG. 11. Referring back to FIG. 11, after the smoothed data has been calculated (block 1104), the audio signature generator 1000 determines maxima points in smoothed data (e.g., weighted zero crossing data) and the delta times (block 1106).

Figure 13:
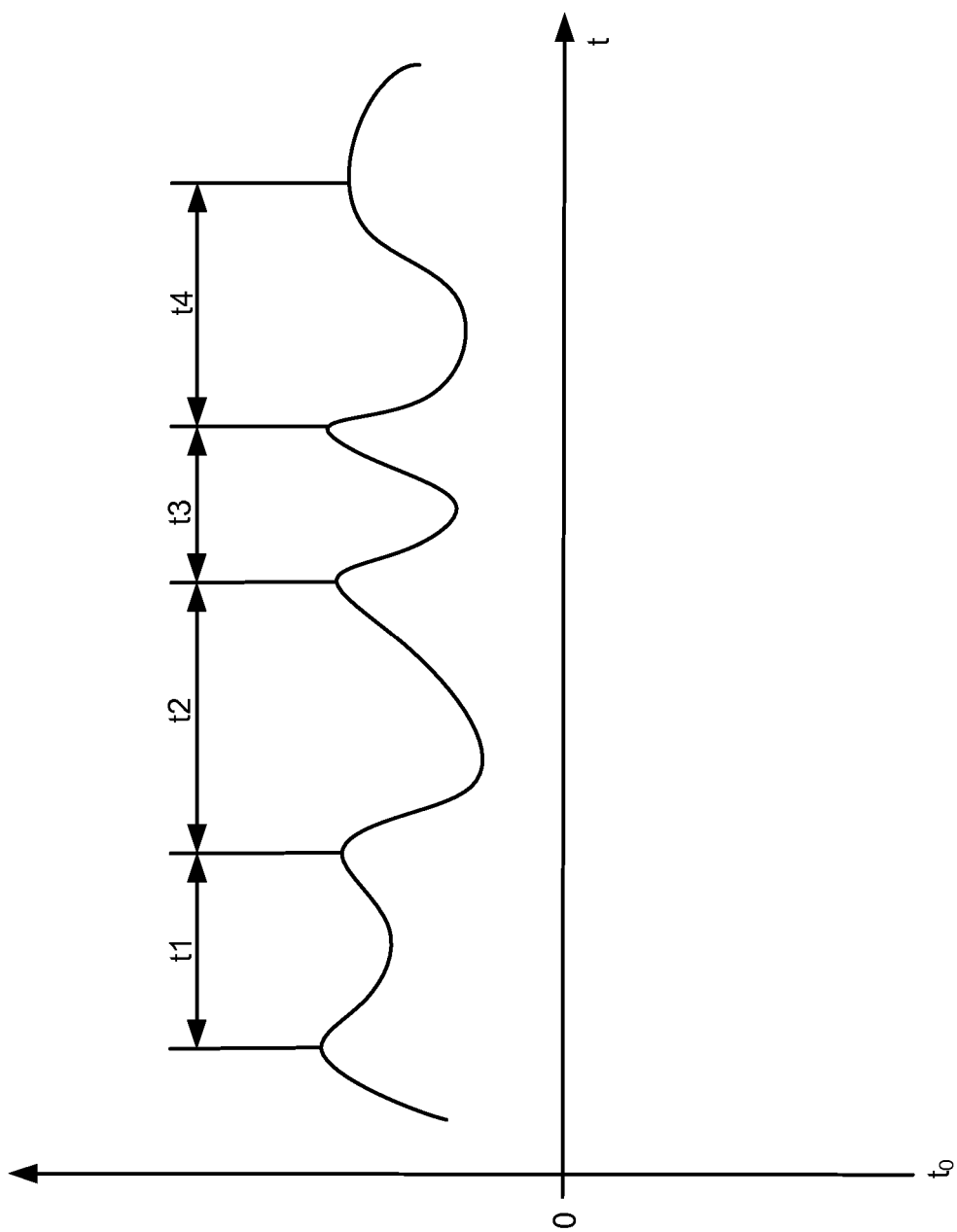
FIG. 13 is an example graph depicting smoothed data generated by the apparatus of FIG. 10.

FIG. 13 is an example graph depicting smoothed data. The delta times associated with the smoothed data are calculated and recorded in a table, a list, or some other data structure. For example, the time difference between a first peak and a second peak (e.g., t1) is calculated and stored. Next, the time difference between the second peak and a third peak is calculated (e.g., t2) and stored. This process continues until all peaks in the smoothed data (e.g., weighted zero crossing data) are analyzed and the delta times have been calculated and stored.

Again referring to FIG. 11, after the delta times have been calculated (block 1106), the signature generator 1000 forms a plurality of N-tuples (e.g., a set of N objects) from the list of delta-times. For example, if the set of delta-times calculated for the smoothed data shown in FIG. 13 is {t1, t2, t3, t4, t5}, two sets of 4-tuples may be formed {t1, t2, t3, t4} and {t2, t3, t4, t5}. The number of elements in the N-tuple (e.g. the value of N) may be selected by analyzing performance constraints and robustness of the signature comparator 416 (FIG. 4) and/or central processing facility 124 (FIG. 1). A signature, composed of the plurality of N-tuples, is formed. The signature may then be transmitted to the signature comparator 416 (FIG. 4) or to the central processing facility 124 (FIG. 1) for analysis (block 1108).

Figure 14:
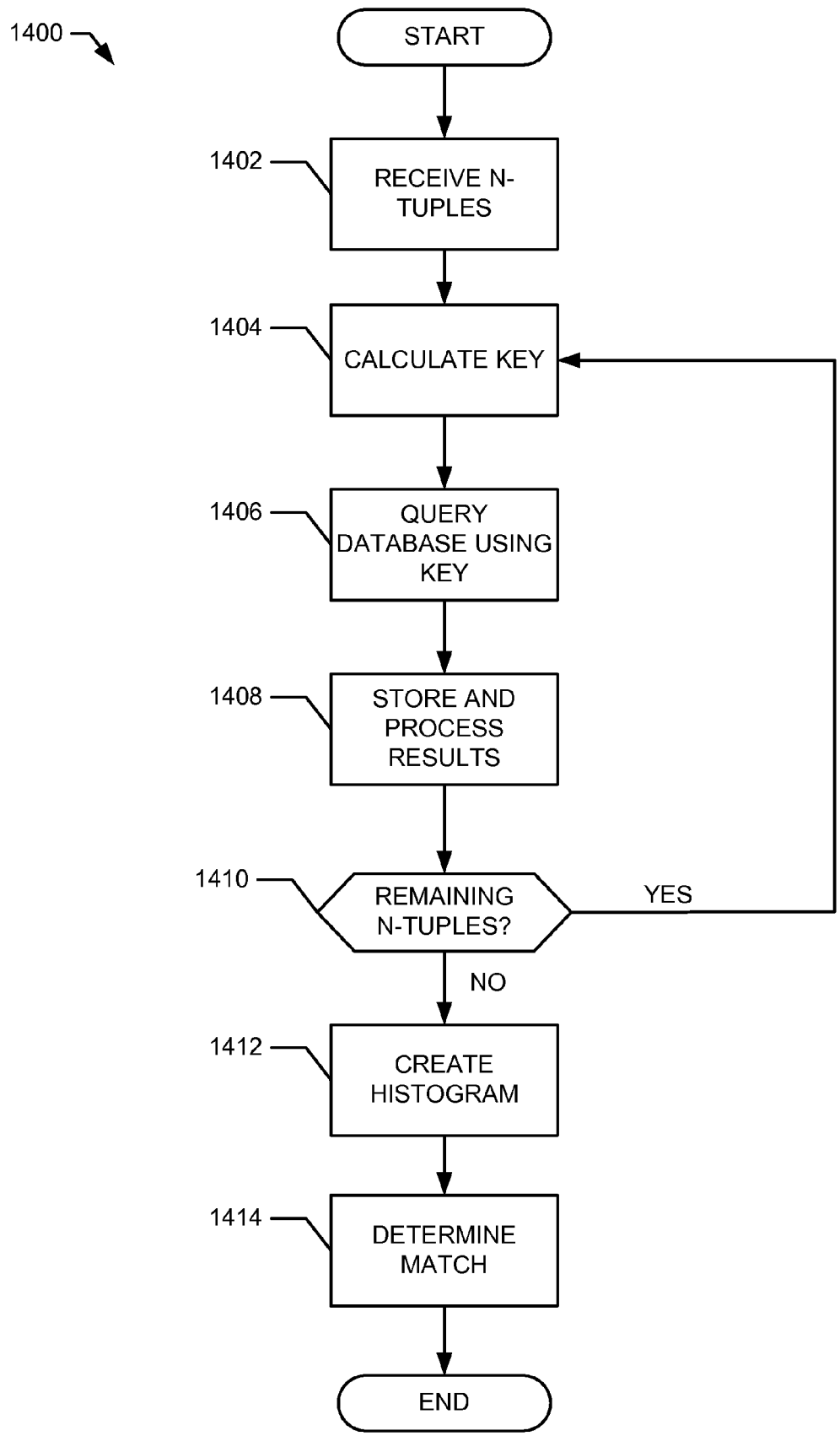
FIG. 14 is a flow diagram depicting an example manner in which the signature comparator of FIG. 4 and/or the central processing facility of FIG. 1 may be configured to compare signatures.

FIG. 14 is a flow diagram depicting an example manner in which the central processing facility 124 of FIG. 1 and/or the signature comparator 416 of FIG. 4 may be configured to match a signature to a broadcast program. For ease of discussion, the following discussion refers to the central processing facility 124. However, the process depicted in FIG. 14 may instead or additionally be performed by the central processing facility 124 may be replaced with the signature comparator 416 or another device configured to determine the program from which one or more signatures originated.

The central processing facility 124 receives the signature composed of N-tuples (block 1402). The central processing facility 124 may begin processing each N-tuple as it is received. The central processing facility 124 may receive all the N-tuples before attempting to determine the source of the signature. The signatures collected or generated at a monitored site (e.g., the monitored site 110 (FIG. 1)) and/or a signature comparator (e.g., the signature comparator 416 (FIG. 4)) may contain noise and, as a result, each value in an N-tuple may be offset (e.g., increased or decreased) before being analyzed to compensate for the noise. In particular, the signature comparator 416 may be configured to increase some values in an N-tuple by one. For example, if an N-tuple received at the signature comparator 416 is equal to {t1, t2, t3}, a new N-tuple may be generated containing the offset values {t1+1, t2, t3+1}. However, all values of the N-tuple may be offset to form a new N-tuple and the example described above is merely one example implementation. The central processing facility 124 may be configured to use an offset value of one but may also be configured to skip the offsetting of the values of the N-tuple.

As each N-tuple is received, a key value (e.g., a hash value) is generated for the N-tuple (block 1404). The key value may be calculated from the values of the elements that compose the N-tuple and may be used to index into a data structure such as, for example, a hash table. For example, the key value associated with the elements of the N-tuple (e.g., {t1, t2, t3, t4}) may be calculated as shown below.

$$\text{key value}(t1, t2, t3, t4) = t4 + \text{prime}*t3 + t2*\text{prime}^2 + t1*\text{prime}^3$$

The value of prime may be any prime number such as 31. However, there are many different methods to calculate a key value based on the elements of an N-tuple and the sum of the elements of the N-tuple described above is merely one example. In any event, the hash table contains program information, reference signatures, and/or any other information that may be used to match the signature to known audio/video content such as, for example, a broadcast program. The contents of the hash table may be filled and/or updated by the reference site processor 122 (FIG. 1) and/or the signature generator 406 (FIG. 4).

After the key value is calculated (block 1404), the central processing facility 124 uses the key value to query a hash table containing program information and time stamp data associated with the program information (block 1406). A person of ordinary skill in the art will readily appreciate that a query into a hash table (e.g., in the course of matching signatures or an audio/video content identification process) may return multiple results (e.g., result in a collision) depending on the method used to calculate the key value. Thus, a list of query results containing the program information and the associated time stamp data is generated for each query and is stored by the central processing facility 124 (block 1408).

The central processing facility 124 may also process the results before storing the list (block 1408). Each of the signatures received by the central processing facility 124 is generated using a group of N-tuples, each of which may have a different time stamp. If the time stamp of an N-tuple is not equal to the time stamp of the first N-tuple received, the time stamps of the results returned by the hash table may be adjusted by the difference between the time stamp of the first N-tuple and the N-tuple currently being analyzed. For example, if the time stamp of the first N-tuple is equal to 10:18:02 and the time stamp of the second N-tuple is equal to 10:18:03, a correction of −1 second is made to the list of results returned by the hash table. The list of results returned by the hash table is adjusted and/or corrected so the results from the hash table are grouped correctly. In the example above, if the list of results is not adjusted, the resulting histogram will contain two values (e.g., 10:18:02 and 10:18:03) instead of the one value (e.g., 10:18:02). The central processing facility 124 determines if there are any remaining N-tuples to be processed (block 1410). If N-tuples remain, control returns to block 1404 and a key value is calculated for the next N-tuple.

Otherwise, a histogram is generated from the lists of query results stored by the central processing facility 124 (block 1412). The histogram is analyzed and the central processing facility 124 determines the most frequently occurring value in the histogram (block 1414). The central processing facility 124 may analyze the number of occurrences and/or frequency of the most frequently occurring value and compare the number of occurrences and/or frequency to a predetermined threshold. If the frequency of the most frequently occurring value is larger than a predetermined threshold, the most frequently occurring value is determined to be a match (block 1414). Otherwise, no match is found.

Although certain example audio signature apparatus and methods have been described herein, the functional blocks making up these examples can be implemented using any desired combination of analog and/or digital hardware. Further, some or all of these functional blocks may be implemented within a processor-based system, such as that shown in FIG. 9 that executes machine readable instructions or programs, which may be embodied in software stored on a tangible medium such as a CD-ROM, a floppy disk, a hard drive, a digital versatile disk, or a memory. Still further, some or all of the functional blocks may be combined or integrated together and/or implemented using multiple functional blocks.

Although certain methods, apparatus and articles of manufacture have been described herein, the scope of coverage of this patent is not limited thereto. To the contrary, this patent covers all embodiments including apparatus, methods and articles of manufacture fairly falling within the scope of the appended claims, either literally or under the doctrine of equivalents.

What is claimed is:

1. A method of metering exposure to at least one of audio and video content, comprising:
    receiving a signature associated with audio content presented at a monitored site, wherein the signature is based on a plurality of time intervals between audio features of the audio content presented at the monitored site; and
    identifying the audio content presented at the monitored site based on the received signature.

2. A method as defined in claim 1, wherein the audio features of the audio content include at least one of peak values and zero crossings.

3. A method as defined in claim 1, wherein identifying the audio content presented at the monitored site based on the received signatures includes comparing a reference signature associated with a reference signal to the signature associated with the audio content presented at the monitored site.

4. A method as defined in claim 1, wherein the audio content presented at the monitored site is delivered via at least one of a broadcast station and a local content delivery device.

5. A method as defined in claim 1, further comprising generating the signature based on the plurality of time intervals between the audio features of the audio content presented at the monitored site.

6. A method as defined in claim 5, further comprising filtering the audio content prior to generating the signature.

7. A method as defined in claim 6, wherein the filtering comprises filtering with a low-pass filter.

8. An apparatus for metering exposure to at least one of audio and video content, comprising:
    a memory; and
    a processor in communication with the memory and programmed to:
        generate a signature associated with audio content presented at a monitored site, wherein the signature is based on a plurality of time intervals between audio features of the audio content presented at the monitored site; and
        identify the content presented at the monitored site based on the signature.

9. An apparatus as defined in claim 8, wherein the audio features of the audio content include at least one of peak values and zero crossings.

10. An apparatus as defined in claim 8, wherein the processor is programmed to identify the content presented at the monitored site based on the signature by comparing a reference signature associated with a reference signal to the signature associated with the audio content presented at the monitored site.

11. An apparatus as defined in claim 8, wherein the content presented at the monitored site is delivered via at least one of a broadcast station and a local content delivery device.

12. An apparatus as defined in claim 8, wherein the processor is further programmed to generate the signature based on the plurality of time intervals between the audio features of the audio content presented at the monitored site.

13. An apparatus as defined in claim 12, wherein the processor is further to filter the audio content prior to generating the signature.

14. An apparatus as defined in claim 12, wherein the processor is to filter the content with a low-pass filter prior to generating the signature.

15. A tangible machine readable medium having instructions stored thereon that, when executed, cause a machine to at least:
    generate a signature associated with content presented at a monitored site based on a plurality of time intervals between audio features of audio content presented at the monitored site; and
    identify the content presented at the monitored site based on the signature.

16. A machine readable medium as defined in claim 15, wherein the audio features of the audio content include at least one of peak values and zero crossings.

17. A machine readable medium as defined in claim 15, wherein the instructions, when executed, cause the machine to identify the content by comparing the signature to a reference signature associated with a reference signal.

18. A machine readable medium as defined in claim 17, wherein the instructions further cause the machine to filter the audio content prior to generating the signature.

19. A machine readable medium as defined in claim 17, wherein the instructions cause the machine to low-pass filter the content.

* * * * *